United States Patent [19]
Gregory

[11] 4,236,757
[45] Dec. 2, 1980

[54] HYDRAULIC SYSTEM CONTROL MEANS

[75] Inventor: Ted W. Gregory, Mundelein, Ill.

[73] Assignee: Arens Controls, Inc., Evanston, Ill.

[21] Appl. No.: 947,207

[22] Filed: Sep. 29, 1978

[51] Int. Cl.³ .............................................. B60P 1/16
[52] U.S. Cl. .................................. 298/22 C; 74/502; 74/531
[58] Field of Search ................... 298/22 C; 74/501 R, 74/502, 503, 531; 251/93, 110

[56] References Cited

U.S. PATENT DOCUMENTS

| | | | |
|---|---|---|---|
| 2,126,234 | 8/1938 | Weber | 74/502 |
| 2,172,294 | 9/1939 | Riddell | 74/502 |
| 2,805,584 | 9/1957 | Hinsey | 74/502 |
| 3,826,156 | 7/1974 | Dornaus | 74/531 X |
| 4,029,359 | 6/1977 | Glomski | 298/22 C |

FOREIGN PATENT DOCUMENTS 559767  3/1944  United Kingdom .................. 298/22 C

*Primary Examiner*—L. J. Paperner

*Attorney, Agent, or Firm*—Trexler, Wolters, Bushnell & Fosse, Ltd.

[57] ABSTRACT

In a control for use in a hydraulic system of the type which includes a hydraulic cylinder arranged to raise and lower a load such as a dump bed of a vehicle, wherein the hydraulic system is actuated for raising and lowering the dump bed upon axial displacement of a rod member contained within an outer conduit from a neutral position in first and second respective axial directions and wherein the hydraulic system is deactivated upon the rod member being in the neutral position. The control includes a tubular member which is adapted to be connected to the outer conduit, a control knob, and a rigid inner member partially within the tubular member having a first end connected to the rod member and a second end supporting the control knob. A latch supported by the tubular member is arranged for releasably locking the inner member in a neutral position with respect to the tubular member for precluding inadvertent axial displacement of the rod member from the neutral position.

14 Claims, 7 Drawing Figures

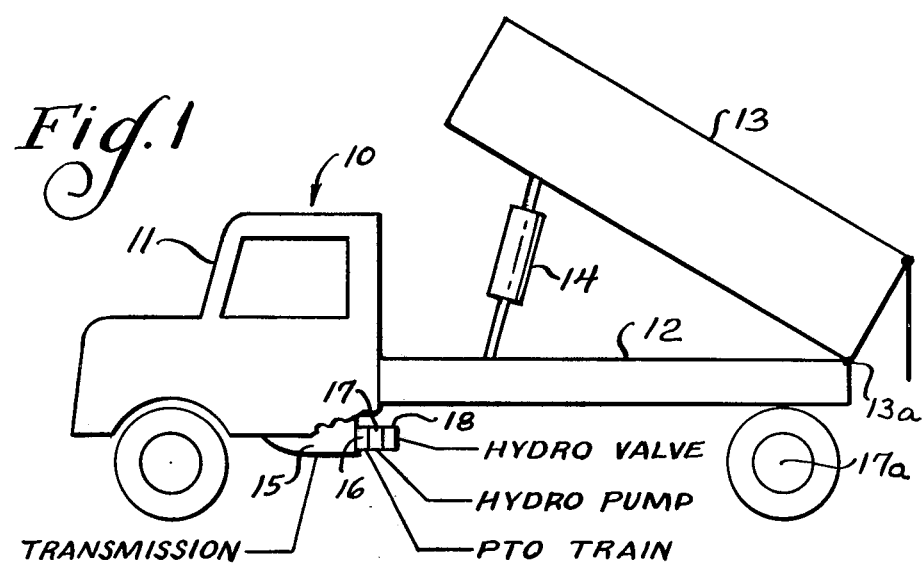
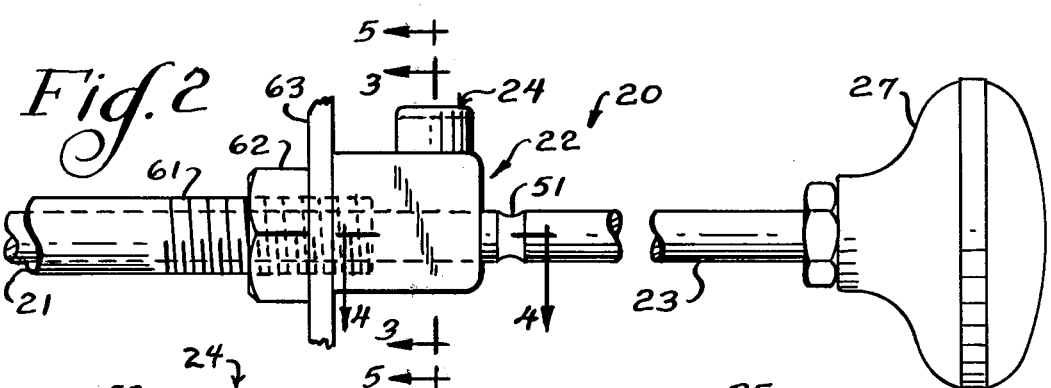
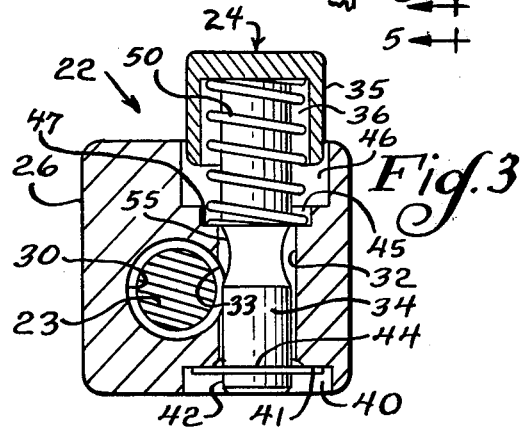
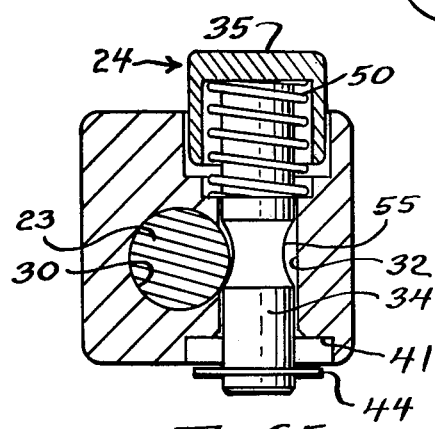
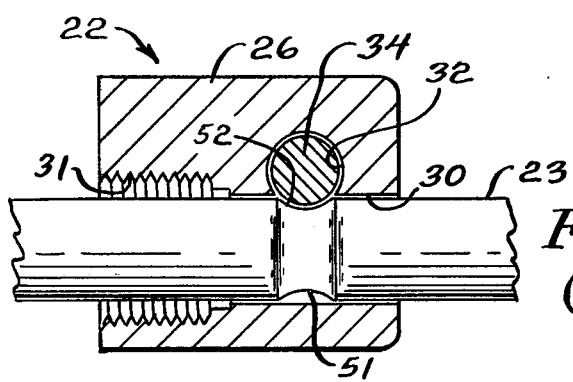

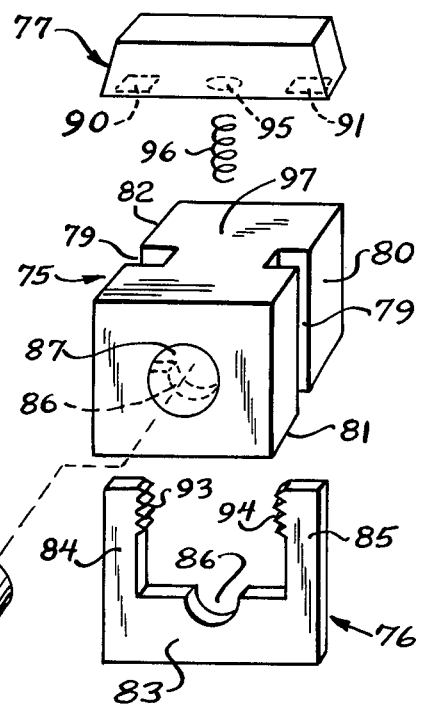
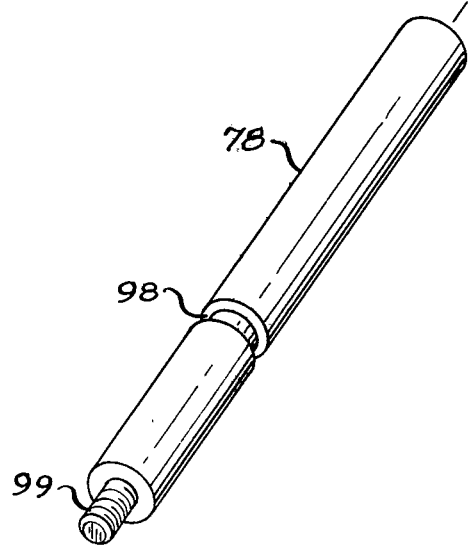

HYDRAULIC SYSTEM CONTROL MEANS

BACKGROUND OF THE INVENTION

The present invention is generally directed to a control means for use in a hydraulic system of the type which includes a hydraulic cylinder arranged to raise and lower a load, and more particularly, to a control means which releasably locks the hydraulic system in a neutral position to prevent inadvertent actuation of the hydraulic system.

There are many applications where a hydraulic system is utilized for raising and lowering a load or for otherwise controlling movement in relatively opposite directions. One such application is found in a vehicle such as a truck of the type having a dump bed. The vehicle is customarily equipped with a hydraulic pump which is connected to the vehicle transmission which provides fluid under pressure to a hydraulic valve which is in turn connected to a cylinder which raises and lowers the dump bed to facilitate the emptying thereof. For controlling the actuation of the hydraulic system to effectuate the raising and lowering of the dump bed, such systems generally include a control means in the nature of a flexible push-pull or Bowden cable consisting of an outer conduit having therein an inner member which is coupled to suitable valves for controlling the raising and lowering of the dump bed. The inner member is displaceable axially within the outer conduit and upon displacement in a first direction from a neutral position the hydraulic system is actuated for raising the dump bed and upon axial displacement from the neutral position in a second direction the hydraulic system is actuated for lowering the dump bed.

Prior control means for this application have generally included a rigid shaft contained within a tubular member. The tubular member is connected to the outer conduit of a push-pull cable and the inner member of the cable is connected to the rod member. A control knob is fixed on the end of the rod opposite its connection to the cable inner member. When the control knob and thus the rod member is in the neutral position, the hydraulic system is deactuated and maintains the dump bed in a static condition whether fully or partially raised, or completely lowered. Unfortunately, the control means of the prior art have been susceptible to inadvertent displacement of the rod member due to either an accidentally applied force to the control knob or due to vibrations resulting from vehicle movement. As a result, accidental raising or lowering the dump bed of such vehicles has occurred. Such an occurrence not only may necessitate the refilling of the dump bed, but also may create a dangerous condition when a loaded dump bed is accidentally raised during movement of the vehicle, or when the bed may lower with a person under the bed.

It is, therefore, a general object of the present invention to provide a new and improved control means for a hydraulic system.

It is a more particular object of the present invention to provide a control means for a hydraulic system of the type which is arranged to raise and lower the dump bed of a vehicle wherein the control means releasably locks the hydraulic system in a neutral position to preclude inadvertent actuation of the system.

It is a still further object of the present invention to provide a new and improved control means for a hydraulic system of the type which raises and lowers the dump bed of a vehicle which includes a releasable locking device for locking the hydraulic system in a neutral position and which provides ready intentional release of the control means from the neutral position to facilitate intentional actuation of the hydraulic system.

SUMMARY OF THE INVENTION

The invention, therefore, provides a control means for use in a hydraulic system of the type which includes a hydraulic cylinder which is arranged to raise and lower a load such as a dump bed of a vehicle, wherein the hydraulic system is actuated for raising and lowering the dump bed upon axial displacement of an inner member contained within an outer conduit from a neutral position in first and second respective axial directions, and wherein the hydraulic system is deactuated upon the inner member being in the neutral position. The control means includes a tubular member adapted to be connected to the outer conduit, a control knob, and a rod member partially within the tubular member having a first end connected to the inner member and a second end supporting the control knob. The control means also includes a latch means supported by the tubular member and arranged for releasably locking the rod member in a neutral position with respect to the tubular member for precluding inadvertent axial displacement of the rod member from the neutral position.

The invention also provides a releasable locking device for use in a hydraulic system of the type which includes a hydraulic cylinder arranged to raise and lower the dump bed of a vehicle wherein the hydraulic system is actuated for raising and lowering the dump bed upon axial displacement of an inner member contained within an outer conduit of a push-pull cable from a neutral position in first and second respective axial directions and wherein the hydraulic system is deactuated upon the inner member being in the neutral position. The releasable locking device includes a rod member having first and second ends and a recess intermediate the ends, wherein the first end is secured to the cable inner member and the second end has a control knob thereon. The releasable locking device further includes a body fixed to the outer conduit which includes a locking member movable between a first position and a second position. The body also includes means allowing the rod to pass therethrough adjacent to the locking member for facilitating connection of the shaft to the rod member at the shaft first end. The locking member is arranged to engage the rod member recess when in the first position for locking the cable inner member and the rod member in the neutral position for precluding inadvertent displacement of the shaft and the rod from the neutral position, and is also arranged to disengage the recess when in the second position to allow intentional release and displacement of the rod member and shaft inner member from the neutral position to afford actuation of the hydraulic system.

BRIEF DESCRIPTION OF THE DRAWINGS

The features of the present invention which are believed to be novel are set forth with particularity in the appended claims. The objects and further advantages thereof may best be understood by making reference to the following description taken in conjunction with the accompanying drawings, and the several figures of which like reference numerals identify like elements, and wherein:

FIG. 1 is a side plan view illustrating a vehicle having a dump bed which may advantageously utilize the control means of the present invention;

FIG. 2 is a side elevational view of a control means embodying the present invention;

FIG. 3 is a cross-sectional view taken along lines 3—3 of FIG. 2;

FIG. 4 is a partial cross-sectional view taken along lines 4—4 of FIG. 2;

FIG. 5 is a cross-sectional view taken along lines 5—5 of FIG. 2 with the parts in a relatively different position;

FIG. 6 is a partial side elevational view of an alternate form of a shaft which may be utilized in the control means of FIG. 2; and FIG. 7 is an exploded perspective view of another embodiment of the present invention.

DESCRIPTION OF THE PREFERRED EMBODIMENT

Referring now to FIG. 1, there is shown a vehicle 10 which may advantageously employ the control means of the present invention. The vehicle 10 is of the type commonly referred to as a "dump truck" which includes a cab 11, a frame 12, a dump bed 13 hingedly connected to the frame 12 at a pivot point 13a. Disposed between the frame 12 and the dump bed 13 is a hydraulic cylinder 14. The hydraulic cylinder 14 preferably is of the double-acting type and is arranged to raise and lower the dump bed 13 about the pivot point 13a.

The vehicle 10 also includes a transmission 15 and power train 16 which coact to deliver power from the vehicle motor to the vehicle rear axle 17a to facilitate movement of the vehicle. Also coupled to the vehicle power train 16 is a hydraulic pump 17 and a hydraulic valve 18. The hydraulic pump 17, hydraulic valve 18, and hydraulic cylinder 14 comprise a hydraulic system for raising and lowering the dump bed 13 of the vehicle.

As is well known, for controlling the hydraulic system a control means is customarily provided which includes a flexible cable which has an inner member which is displaceable axially in first and second axial directions about a neutral position for controlling the hydraulic system for raising and lowering the dump bed 13. The inner member is usually coaxially disposed within an outer conduit or sheath which supports the axial movement of the inner member. The inner member is preferably connected to a rigid rod or shaft which is in turn contained within a rigid tubular member which is connected to the conduit. A control knob is secured to the opposite end of the shaft and is disposed within the cab 11. When the knob is pushed inwardly or pulled outwardly from the tubular member, the inner member of the cable is caused to be likewise displaced axially for actuating the hydraulic system for raising and lowering the dump bed. The axial displacement of the inner member occurs about a neutral position which causes the hydraulic system to be deactuated and to maintain the hydraulic system in a static state to render the dump bed in a stationary position. When the inner member is in the neutral position, the dump bed may be held stationary in either the fully raised position as shown, in a partially raised position, or in the fully lowered position.

Referring now to FIG. 2, there is shown a control means embodying the present invention which provides releasable locking of the rod or shaft member in the neutral position to preclude inadvertent actuation of the hydraulic system and thus inadvertent raising or lowering of the dump bed 13. The control means 20 includes a tubular member 21 which, as is well known, is connected to the outer conduit, and a releasable locking device including a body 22, a shaft or rod 23 and a control knob 27. As illustrated by the solid lines, the shaft 23 and body 22 are arranged to cooperate with a locking member, designated generally 24.

As can be seen in FIGS. 3, 4 and 5, the body 22 is formed from a block of solid material 26 and includes a first through bore 30 of proper diameter to allow the shaft 23 to pass therethrough for connection to the inner member of a well-known flexible push-pull cable (not shown) within the outer conduit thereof. The bore 30 includes an internal thread 31 which is arranged to mate with an external thread 61 customarily provided on the tubular member 21 for mounting the body 22 to the tubular member. A nut 62 on the thread 61 clamps a mounting panel or bracket 63 between the nut 62 and the body 22. The mounting panel or bracket is suitably fixed within the cab in any suitable fashion. The body 22 also includes a second bore 32 which is substantially perpendicular to the first bore 30 and which partially intersects the first bore 30 at an area of intersection 33.

Within the second bore 32 is disposed the movable locking member 24 which includes a pin 34. The pin 34 engages a cylindrical cap 35 which is hollow and which has an inner diameter dimension greater than the outer diameter dimension of the pin 34 to form an annular space 36 therebetween.

The bore 32 includes a first counterbore 40 which defines an annular shoulder 41 adjacent to the end 42 of the pin 34. At the end 42 of the pin 34 is disposed a retaining washer 44 which abuts the annular shoulder 41.

The second bore 32 also includes second and third counterbores 45 and 46. The counterbore 46 is dimensioned for receiving the cylindrical cap 35 and the counterbore 45 is dimensioned for receiving a spring means comprising a coiled spring 50 which is coaxially mounted to the pin 34. The coil spring acts against the annular shoulder 47 formed by the counterbore 45 for biasing the pin in a first position to be described hereinafter. The annular space 36 between the cylindrical cap 35 and the pin 34 provides an extended area into which the coiled spring 50, which is of substantial axial length, is disposed. Coiled springs of substantial axial length, as well known, maintain substantially constant spring parameter over extended periods of use and, in general, are longer lasting than springs of shorter axial length.

As best seen in FIG. 4, the shaft 23 is provided with an annular recess 51 which is circumferentially disposed about the shaft 23. The recess 51 has an arcuate surface 52 generally corresponding to the overlapping perimeter of the second bore 32. The movable pin 34 in turn includes an annular recess 55 which is also circumferentially disposed about the pin 34 and which has an arcuate surface generally corresponding to the perimeter of the first bore 30 as best seen in FIG. 5.

The recess 51 and the pin 34 are arranged to engage one another as shown in FIG. 4 for releasably locking the control means and thus the hydraulic system in a neutral position. This condition is illustrated in FIGS. 3 and 4 wherein the spring 50 biases the pin 34 in the first position whereat the pin 34 engages the circumferential recess 51 of the shaft 23.

For releasing the shaft 23 from the pin 34, it is only necessary to depress the cylindrical cap 35 until the pin 34 assumes a second position whereat the recess 55 of the pin is adjacent the shaft 23 to allow the shaft 23 to be displaced in either the first or second directions for actuating the hydraulic system as shown in FIG. 5. As can be seen in FIG. 5, when the pin 34 is at the second position, the shaft 23 is free to be displaced in the first or second axial direction. The spring 50 is thereby compressed due to the axial movement of the pin 34 which also displaces the retaining washer 44 from the annular shoulder 41. The condition of the shaft 23 and pin 34 shown in FIG. 5 corresponds to the relative position of the body 22 to the shaft 23 with the shaft partially withdrawn as shown in dashed lines in FIG. 2. Because the spring 50 is compressed, when it is necessary to once again place the control means into the neutral position, it is only necessary to move the shaft 23 towards the neutral position, and when the neutral position is reached, that is to say, when the pin 34 is aligned with and adjacent to the recess 51 of shaft 23, the pin 34 will snap into place for positively locking the shaft 23 in the neutral position. The shaft 23 and knob 27 can be pushed inwardly by the same depression of the pin 34 and accompanying unlocking of the shaft 23 as set forth above.

Referring now to FIG. 6, it illustrates another form of shaft which may be utilized in place of the shaft 23 shown in FIGS. 2-4. The shaft 70 thereshown includes a recess 71 as in the case of the shaft 23 of FIG. 2 but in addition, the shaft 70 has a tapered portion 72 leading into the recess 71. As a result, a control means in accordance with this aspect of the invention will provide locking and required manual and intentional unlocking for shaft displacement in a first direction while affording shaft displacement in the opposite direction without requiring manual and intentional unlocking. Of course, additional forms of shafts may be readily utilized without departing from the present invention, such as for example, a shaft having a plurality of axially spaced recesses. Such a shaft would provide multiple shaft locking positions which would be most advantageous in many applications such as in a transmission or the like.

Referring now to FIG. 7, the alternate form of control means embodying the present invention there illustrated generally includes a body 75, a stamping 76, a release button 77, and a shaft or plunger 78. The body 75 may be formed from a portion of machined square bar stock. The body includes a recess 79 which extends along one side 80, around the bottom portion 81, and up along an opposing side 82 of the body 75. A through bore 87 dimensioned for receiving the shaft 78 extends through the body and communicates with a portion of the recess 79 which extends along the bottom portion 81 of the body.

The stamping 76 is preferably formed from steel sheet material stock and includes a base portion 83 and a pair of spaced apart substantially parallel arm extensions 84 and 85. Between the extensions 84 and 85 is an arcuate cut-out portion 86 having a radius slightly greater than the radial dimension of the shaft 78. The body recess 79 and the extensions 84 and 85 are appropriately dimensioned so that the recess 79 receives the extensions 84 and 85 with their ends projecting above the baseplate and with the arcuate cut-out portion 86 of the base 83 partially blocking the bore 87. The arcuate portion 86 is shown in dotted lines when in this position.

The release button 77 is preferably formed from plastic or any other durable material. It has a pair of spaced apart slots 90 and 91 which receive the ends of the extensions 84 and 85. To that end, the extensions 84 and 85 include saw-tooth surfaces 93 and 94 for frictionally engaging the slots 90 and 91. Preferably, the extensions 84 and 85 are spaced apart by a slightly lesser distance than the spacing between the slots 90 and 91 so that the extensions may be resiliently secured to the release button 77.

The release button 77 also includes a recess 95 which is adapted for receiving a return spring 96 therein. The return spring may be held in place by ultrasonically welding it to the upper surface 97 of the body 75. The return spring causes the release button to be biased in the direction away from the faceplate upper surface 97 corresponding to the locked position.

The shaft 78 is threaded at end 99 so that it is threadingly engageable with the conduit inner member. The outer conduit may be secured to the body in the manner illustrated in FIG. 2 with the bore 87 having an internal thread for receiving an external thread of a tubular member. The shaft 78 may also support a control knob as well.

In operation, the shaft 78 has a circumferential groove 98 which receives or is engaged by the arcuate portion 86 of the stamping 76 for locking the shaft in a fixed axial position. When displacement of the shaft is desired, the release button is depressed against the spring bias to cause the arcuate portion 86 to exit the groove 98. The shaft may thereupon be displaced in a desired direction. The release button may then be released. A further displacement of the shaft is possible.

When it is desired to once again lock the shaft, the shaft is merely displaced in the appropriate direction to bring the groove 98 into alignment with the stamping 76. The arcuate portion 86 will immediately and positively snap into the groove 98 under the spring bias of spring 96 causing the shaft to once again be in the locked position. Here again, of course, the shaft 98 may include a plurality of axially spaced grooves or a tapered recess construction as shown in FIG. 6.

As can be appreciated from the foregoing embodiments, the present invention provides a new and improved control means for use in a hydraulic system of a type which raises and lowers a load such as the dump bed of a vehicle wherein the hydraulic system is actuated for raising and lowering the dump bed upon axial displacement of an inner member contained within an outer conduit from a neutral position in first and second respective axial directions. The control means includes a releasable locking device which positively locks a rod member in a neutral position to prevent inadvertent actuation of the hydraulic system. Furthermore, because the locking device includes a spring biased movable locking member as described, positive and automatic locking of the rod member in the neutral position is afforded. Also, by virtue of the spring biasing, the hydraulic system will only be placed into an actuated condition upon intentional displacement of the rod member relative to the locking device.

It can further be appreciated that the present invention provides a releasable locking device for controlling a hydraulic system which may be controlled and employed by an operator using only one hand to allow the operator's other hand to attend to other functions. As can be seen from the drawings, only the cylindrical cap 35 need be depressed with a thumb for example while the control knob 27 is displaced with the fingers. Furthermore, the locking device including the body 22, shaft 23, and pin 34, may be retrofitted onto other similar prior art controls for advantageously adapting those controls to releasably lock the hydraulic systems in a neutral position.

It must also be understood that the present invention is not only applicable to dump trucks, but also may be applied to any application having a push-pull type control where automatic locking and operator unlocking are required such as transmissions and the like. Therefore, while particular embodiments of the present invention have been shown and described, modifications may be made, and it is intended in the appended claims to cover all such changes and modifications which fall within the true spirit and scope of the invention.

The invention is claimed as follows:

1. A control means for use in a hydraulic system of the type which includes a hydraulic cylinder which is arranged to raise and lower a load such as the dump bed of a vehicle, wherein the hydraulic system is actuated for raising and lower the dump bed upon axial displacement of an inner member contained within an outer conduit from a neutral position in first and second respective axial directions, and wherein the hydraulic system is deactivated upon the inner member being in the neutral position, said control means comprising: a tubular member adapted to be connected to the outer conduit; a control knob; a shaft axially movable within said tubular member and having a first end connected to the inner member and a second end supporting said control knob; and latch means supported by said tubular member and arranged for releasably locking said inner member in a neutral position with respect to said tubular member for precluding inadvertent axial displacement of the inner member from said neutral position, said latch means comprising a body mounted on said tubular member, said body having a first bore through which said shaft passes into said tubular member for connection to the inner member, and a movable member displacement between a first position for locking said shaft in said neutral position and a second position for releasing said shaft, said body including a second bore substantially perpendicular to and partially intersecting said first bore, and wherein said movable member is within said second bore and acts upon said shaft in the area of intersection of said first and second bores for releasably locking said shaft, said movable member comprising a pin, wherein said shaft includes a circumferential recess at the neutral position of said shaft, and wherein said pin is engaged within said recess when in said first position for locking said shaft, said pin including a circumferential recess arranged to be aligned with said shaft when said pin is in said second position for releasing said shaft and allowing axial displacement of said shaft and the inner member from the neutral position.

2. A control means as defined in claim 1 wherein said pin extends externally from said body for providing external release of said shaft.

3. A control means as defined in claim 2 further including spring means for biasing said pin in said first position.

4. A control means as defined in claim 3 wherein said spring means includes a coil spring coaxially mounted on said pin and wherein said pin includes a cylindrical cover having an inner dimension greater than the pin outer dimension to define an annular space for retaining a portion of said spring, said annular space providing a space for accommodating a spring of substantial axial length, and said cylindrical cover extending externally from said body for providing an external actuating member for said pin.

5. A control means as defined in claim 4 wherein said body first bore includes a counter bore and wherein said pin includes a retaining washer at its end opposite said cylindrical cap, said washer and said counter bore coacting for retaining said pin within said second bore.

6. A releasable locking device for use in a hydraulic system of the type which includes a hydraulic cylinder arranged to raise and lower the dump bed of a vehicle, wherein the hydraulic system is actuated for raising and lowering the dump bed upon axial displacement of an inner member contained within an outer conduit from a neutral position in first and second respective axial directions, and wherein the hydraulic system is deactuated upon the inner member being in the neutral position, said releasable locking device comprising: a rigid shaft having first and second ends and a recess intermediate said ends, said second end being adapted for supporting a control knob; and a body adapted to be fixed to the outer conduit and including a locking member movable between a first position and a second position, said body also including means allowing said shaft to pass therethrough adjacent to said locking member and for facilitating connection of said shaft to the inner member at said first end, said locking member being arranged to engage said shaft recess when in said first position for locking said shaft and the inner member in the neutral position for precluding inadvertent displacement of said shaft and the inner member from the neutral position, and being arranged to disengage said recess when in said second position to allow intentional release and displacement of said shaft from said neutral position to afford actuation of the hydraulic system, said locking member including a pin, said pin having a second recess arranged to be aligned with said shaft when said locking member is in said second position for allowing release and displacement of said shaft, said shaft recess being circumferentially disposed about said shaft and said pin recess being circumferentially disposed about said pin.

7. A locking device as defined in claim 6 wherein said body includes a first bore allowing said shaft to pass therethrough and a second bore substantially perpendicular to said first bore and partially intersecting said first bore, and wherein said locking member comprises said pin disposed within said second bore, said shaft and said pin coacting in the area of intersection of said bores for alternatively locking said shaft in and releasing said shaft from the neutral position.

8. A locking device as defined in claim 7 further including spring means for biasing said pin in said first position.

9. A locking device as defined in claim 8 wherein said pin includes a hollow cylindrical cap having an inner diameter dimension greater than the outer diameter dimension of said pin defining an annular space therebetween, wherein said cap extends externally from said body, and wherein said spring means comprises a coil spring coaxially mounted onto said pin and extending into said annular space, said annular space providing acceptance of a coil spring of substantial axial length.

10. Push-pull control means movable in either direction from a neutral position for controlling a bowden cable, comprising: a body having a bore therethrough; a shaft axially movable within said body in either direction from a neutral position and having a manually accessible end, a control handle on said manually accessible end; and latch means carried by said body and arranged for releasably locking said inner member in a neutral position with respect to said tubular member for precluding inadvertent axial displacement of said shaft from said neutral position, said shaft at said neutral position having a peripheral recess, said latch means having a portion resiliently urged into said peripheral recess, said latch means portion being symmetrical axially of said shaft, said latch means further having a portion extending exterially of said body for manual movement out of said peripheral recess to permit manual movement of said shaft in either direction from said neutral position.

11. A push-pull control means as set forth in claim 10 wherein said latch means portion has an arcuate edge resiliently urged into said shaft recess.

12. A push-pull control means as set forth in claim 11 wherein the latch means comprises a cylindrical pin received in said peripheral recess, said pin having an edge opening recess therein to permit shaft movement upon axial movement of said pin to bring the edge opening recess into registry with said shaft.

13. A push-pull control means as set forth in claim 12 wherein the edge opening recess in said pin comprises a circumferential recess.

14. A push-pull control means as set forth in claim 10 wherein the latch means comprises a plate lying in a plane substantially perpendicular to the access of said shaft and having an edge opening arcuate recess therein comprising the portion resiliently urged into the shaft with peripheral recess.

* * * * *